(12) United States Patent
Signoff et al.

(10) Patent No.: US 8,886,136 B1
(45) Date of Patent: Nov. 11, 2014

(54) TWO-PIN TR SWITCH WITH SWITCHED CAPACITOR

(75) Inventors: David M. Signoff, Mountain View, CA (US); Yung Chen, San Jose, CA (US); Jinho Park, San Jose, CA (US); Li Lin, Saratoga, CA (US)

(73) Assignee: Marvell International Ltd., Hamilton (BM)

( * ) Notice: Subject to any disclaimer, the term of this patent is extended or adjusted under 35 U.S.C. 154(b) by 267 days.

(21) Appl. No.: 13/449,979

(22) Filed: Apr. 18, 2012

Related U.S. Application Data (60) Provisional application No. 61/478,174, filed on Apr. 22, 2011.

(51) Int. Cl.
*H04B 1/44* (2006.01)

(52) U.S. Cl.
CPC .................................... *H04B 1/44* (2013.01)
USPC ............................................. 455/78; 455/83

(58) Field of Classification Search
CPC ............ H04B 1/44; H04B 1/56; H04B 1/005; H04B 1/006; H01P 1/15
USPC ................... 455/78, 80, 82, 83, 550.1, 552.1; 333/103, 104
See application file for complete search history.

(56) References Cited

U.S. PATENT DOCUMENTS

| | | | |
|---|---|---|---|
| 2004/0232982 A1 | 11/2004 | Ichitsubo et al. | |
| 2004/0253939 A1 | 12/2004 | Castaneda et al. | |
| 2007/0213027 A1 | 9/2007 | Rofougaran et al. | |
| 2008/0142935 A1 | 6/2008 | Montoriol et al. | |
| 2009/0116510 A1 | 5/2009 | Georgantas et al. | |
| 2009/0206962 A1 | 8/2009 | Chou et al. | |
| 2011/0143690 A1* | 6/2011 | Jerng et al. | 455/78 |
| 2013/0122832 A1* | 5/2013 | Yoon | 455/82 |

OTHER PUBLICATIONS

PCT International Search Report, Application No. PCT/US11/36520, Aug. 26, 2011.

* cited by examiner

*Primary Examiner* — Thanh Le (57) ABSTRACT

A two-pin transmit/receive switch design includes a switching component configured to selectively switch in elements for a transmit signal path and elements for a receive signal path. A capacitor in the transmit signal path may be switched out when receiving signals on the receive signal path. Being able to selectively switch out the capacitor allows the capacitor value to be selected for optimal operation during transmit mode. For example, insertion loss may be minimized. In addition, elements in the receive signal path may be optimized (e.g., impedance matching) without being affected by or affecting the optimization that was performed for the transmit signal path.

14 Claims, 8 Drawing Sheets

TWO-PIN TR SWITCH WITH SWITCHED CAPACITOR

CROSS-REFERENCE TO RELATED APPLICATIONS

The present disclosure claims priority to U.S. Provisional App. No. 61/478,174, filed Apr. 22, 2011, the content of which is incorporated herein by reference in its entirety for all purposes. The present disclosure is related to U.S. application Ser. No. 13/107,729, filed May 13, 2011, which in turn claims priority to U.S. Provisional App. No. 61/347,112, filed May 21, 2010, the contents of both of which are incorporated herein by reference in their entirety for all purposes.

FIELD OF THE DISCLOSURE

The present disclosure relates to switching in electrical communication devices and in particular to devices that provide for transmitting and receiving radio waves using a common antenna.

BACKGROUND

Unless otherwise indicated herein, the approaches described in this section are not prior art to the claims in this application and are not admitted to be prior art by inclusion in this section.

One of the more important components in present-day wireless communication equipment is the radio frequency (RF) switch. Integrated circuit (IC) designs typically include a transmitter section, a receiver section, and an RF switch on the same IC (sometimes referred to as an "on-chip" design). The purpose of an RF switch is to connect an external antenna between the transmitter section and the receiver section of the IC. Accordingly, such switches are commonly referred to as transmit/receive (TR) switches.

Challenges exist in the design of TR switches. One challenge relates to the unavoidable use of inductors in the design, primarily to provide impedance matching between the antenna and the input circuitry in the receiver section. Conventional designs offer one-pin TR switches which incorporate one or more inductors in their design. Such "on-chip" inductors tend to be large (they take up a lot of chip space), and electrically speaking, they tend to be "lossy" which can lead to an increase in the noise figure in the receive path and to insertion loss in the transmit path. The design criteria for minimizing insertion loss and non-linear effects in transmit mode are sometimes at odds with the design criteria for optimizing impedance matching between the antenna and the receiver section and minimizing the noise figure of the receiver section.

SUMMARY

In embodiments, an integrated circuit (IC) device includes a transmitter stage, a receiver stage, and a switching component. The switching component may be operated to set up a first configuration that includes a transmit circuit for coupling a transmit signal produced by the transmitter stage to an antenna, and to set up a second configuration that includes a receive circuit for coupling a receive signal at the antenna to the receiver stage. In some embodiments, the switching component may comprise a plurality of switches, wherein all of the switches are in a closed state in the first configuration, and all of the switches are in an open state in the second configuration.

The transmit circuit may comprise at least one inductor or capacitor, and the receive circuit may comprise at least one inductor or capacitor. In an embodiment, the transmit circuit comprises an on-chip capacitor, the value of which may be determined based only on an off-chip inductor. In an embodiment, the capacitor and the off-chip inductor define a resonant circuit having a resonant frequency substantially equal to a frequency of a carrier signal of the transmitter stage.

The receive circuit may comprise an on-chip inductor, wherein the value of the inductor is determined based only on the off-chip inductor and on an electrical characteristic of the receiver stage.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

A two-pin TR switch is disclosed in commonly owned U.S. patent application Ser. No. 13/107,729 which overcomes the shortcomings of conventional one-pin solutions by taking the inductor "off-chip." The present disclosure presents additional embodiment of the two-pin TR switch architecture first disclosed in U.S. patent application Ser. No. 13/107,729.

Figure 1:
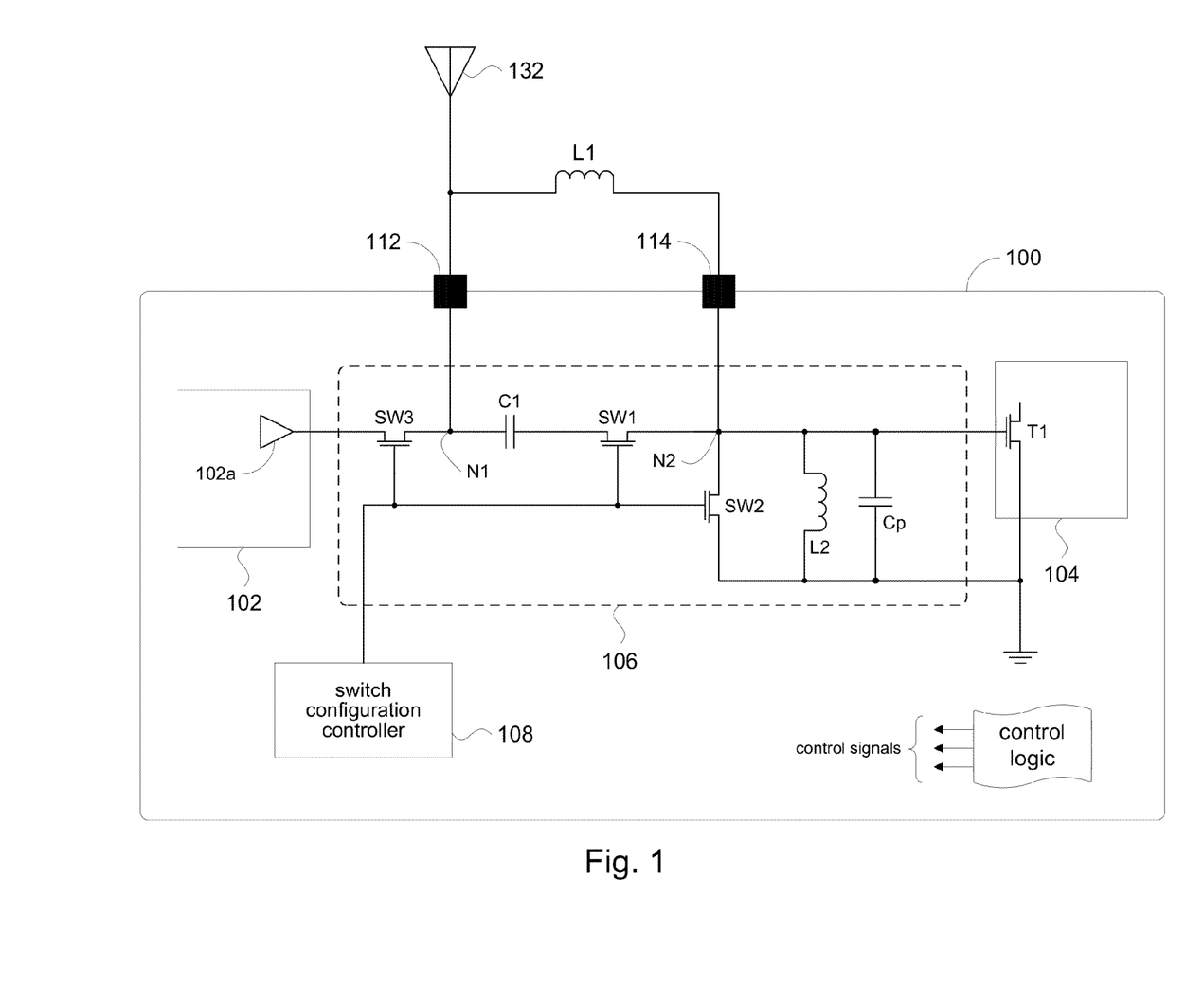
FIG. 1 depicts an illustrative example of a circuit of the present disclosure.

Referring to FIG. 1, in some embodiments, an integrated circuit (IC) device 100 may comprise a transmitter stage 102, a receiver stage 104, a TR switch 106, and a switch configuration controller 108. The IC device 100 may include control logic which produces various control signals to enable, disable, and otherwise coordinate processing and signaling between the constituent components of the IC device. The IC device 100 may include several input/output (I/O) pads, including pads 112 and 114. The pads 112 and 114 are suitable for connection with an antenna 132. Internally, the pads 112 and 114 are connected to respective nodes N1 and N2 in the TR switch 106. In accordance with the present disclosure, an inductor L1 is provided to achieve impedance matching with the IC device 100. The antenna 132 and inductor L1 are said to be "off-chip" in that they are elements that are not on the IC device 100. On the other hand, the transmitter stage 102, the receiver stage 104, and the TR switch 106 are deemed to be "on-chip" since these circuits are fabricated in the IC device 100.

The transmitter stage 102 may be configured to generate a transmit signal for transmission by the antenna 132. In accordance with principles of the present disclosure, an output of the transmitter stage 102 is connected to the TR switch 106. The transmitter stage 102 may include an output driver 102a (e.g., a power amplifier) to output a suitable transmit signal to the TR switch 106.

The receiver stage 104 may be configured to receive signals sensed by the antenna 132. In accordance with the present disclosure, received signals sensed by the antenna 132 are coupled to the receiver stage 104 via the TR switch 106.

In the illustrative embodiment shown in FIG. 1, the TR switch 106 comprises a set of switching elements SW1, SW2, and SW3 that may be controlled by a switch configuration controller 108. The switching elements SW1-SW3 may be any suitable device that can be fabricated on-chip in the IC device 100. In some embodiments, for example, the switching elements SW1-SW3 may be field-effect transistors (FETs). The TR switch 106 further comprises a capacitor C1 and an inductor L2. The received signal sensed by the antenna 132 may be coupled to the receiver stage 104 by the TR switch 106. In various embodiments, the TR switch 106 and switch configuration controller 108 are on-chip components.

Typically, the front end of the receiver stage 104 is designed using a low noise amplifier (LNA). The active portion of an LNA front end typically includes a transistor, shown in FIG. 1 as transistor T1. The parasitic capacitance in the transistor T1 may be represented in the TR switch 106 as capacitor Cp. In some embodiments, capacitor Cp may represent an aggregate capacitance that constitutes an aggregation of the parasitic capacitances from the receiver stage 104 (e.g., transistor T1), the switch SW2, and any other electronic elements that might be connected to node N2, such as electrostatic discharge (ESD) protection structures and so on. In some embodiments, the capacitor Cp may include an actual physical capacitor which may be added to tune the capacitance value for Cp at node N2.

Figure 2:
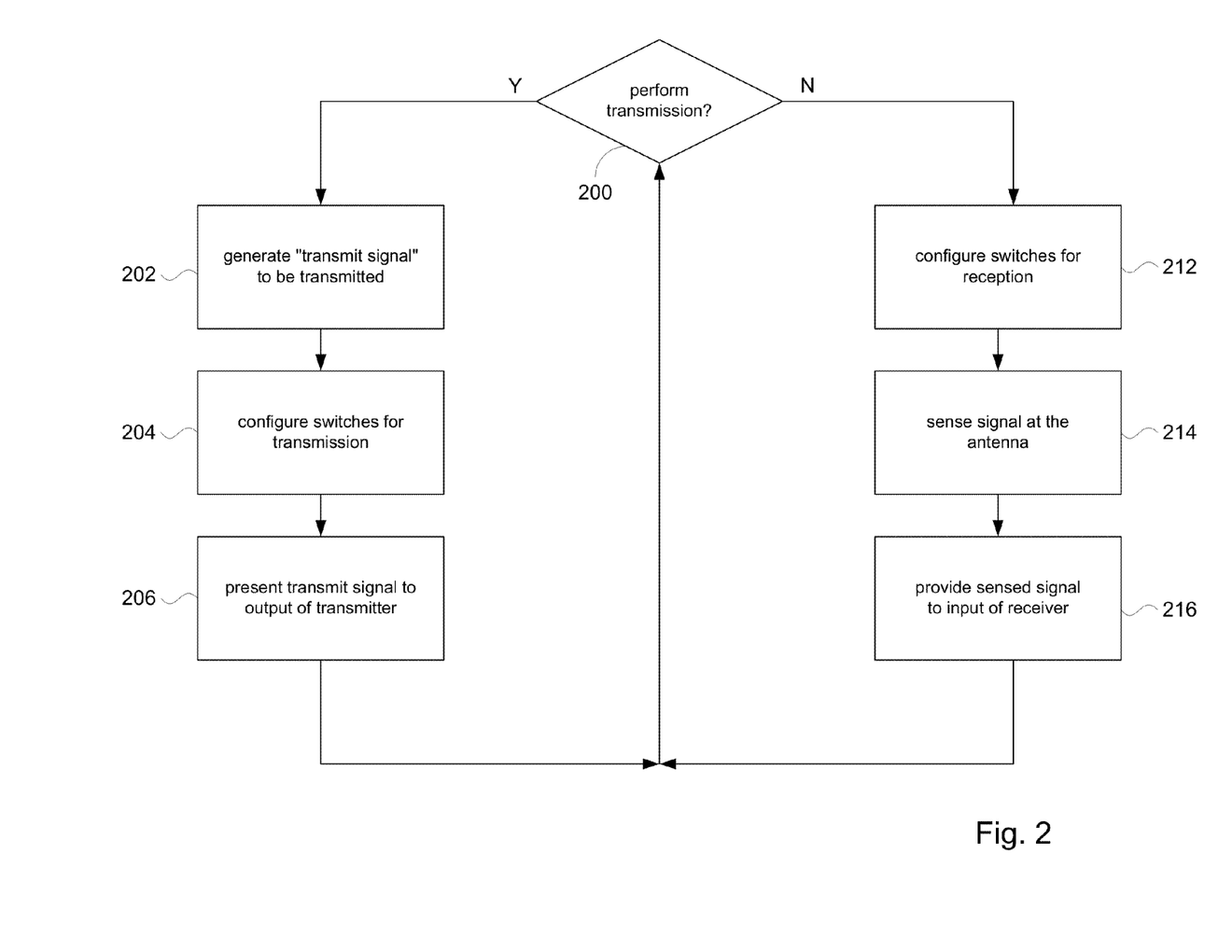
FIG. 2 shows a high level flow chart of switch operation.

FIG. 2 shows a flowchart for a typical operating sequence of the IC device 100. In a decision block 200, the control logic in the IC device 100 may determine whether to operate in transmit mode or in receive mode. It will be appreciated that the sequence of actions shown in the figure does not necessarily occur in the order shown. Rather, the figure serves only to identify the various actions that may be performed in accordance with the present disclosure, but does not serve to set forth a specific order in which the actions are performed.

In block 202, if information is to be transmitted, then the control logic may cause the information to be processed by the transmitter stage 102 to produce a suitable transmit signal. In block 204, the control logic may signal the switch configuration controller 108 to set the switches SW1-SW3 in a configuration for signal transmission. As will be shown, the switches may be configured to couple the transmitter stage 102 to the antenna 132. In block 206, the control logic may signal the transmitter stage 102 to present the transmit signal to the output of the transmitter stage 102, and hence into the TR switch 106, thus coupling the transmit signal to the antenna 132.

If, in decision block 200, the control logic determines that receive mode is appropriate, then in block 212, the control logic may signal the switch configuration controller 108 to set the switches SW1-SW3 in a configuration for signal reception. As will be shown, the switches SW1-SW3 may be configured to couple the antenna 132 to the receiver stage 104. In block 214, the antenna 132 may sense a signal, and in block 216, a sensed signal is coupled to the receiver stage 104 via the TR switch 106.

Figure 3:
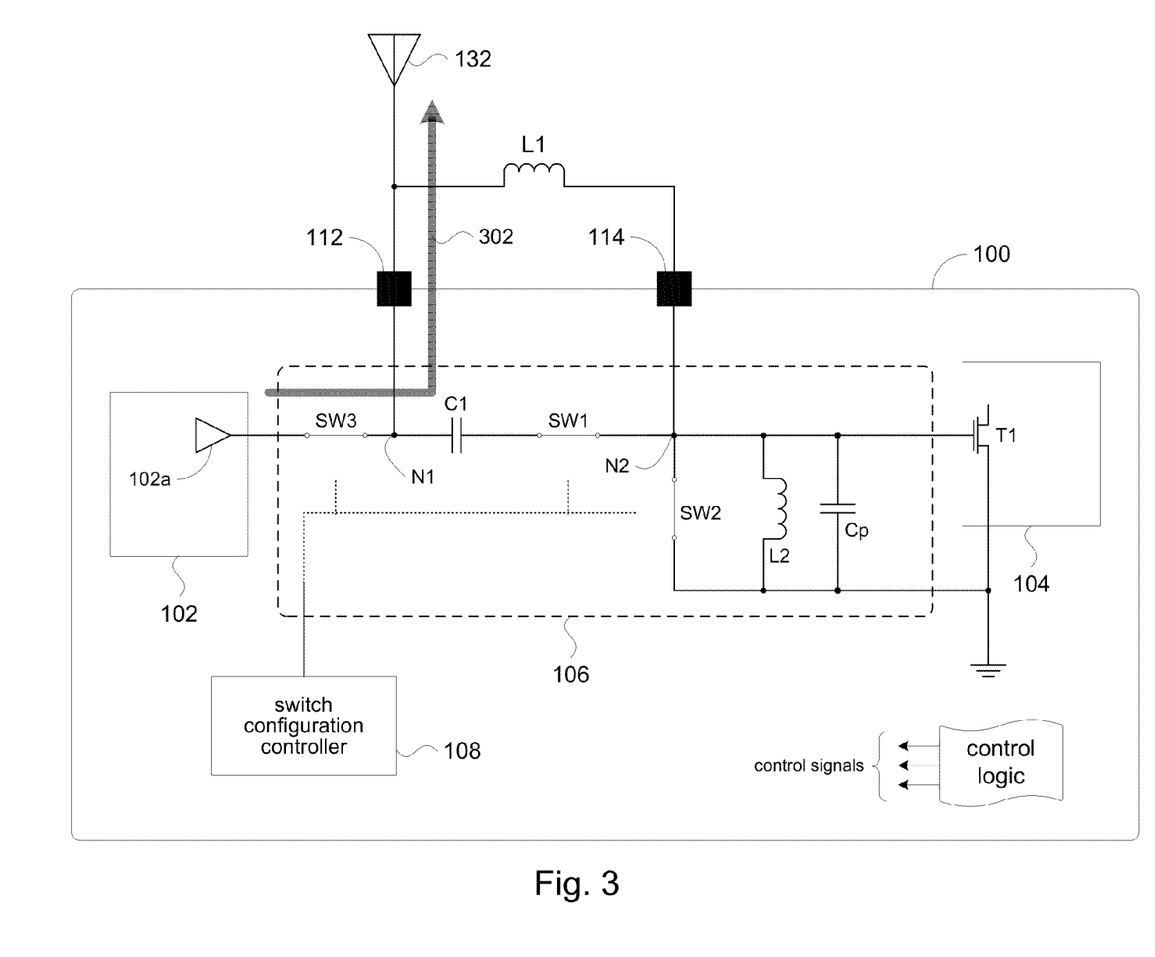
FIG. 3 shows the circuit of FIG. 1 in transmit mode.
Figure 3A:
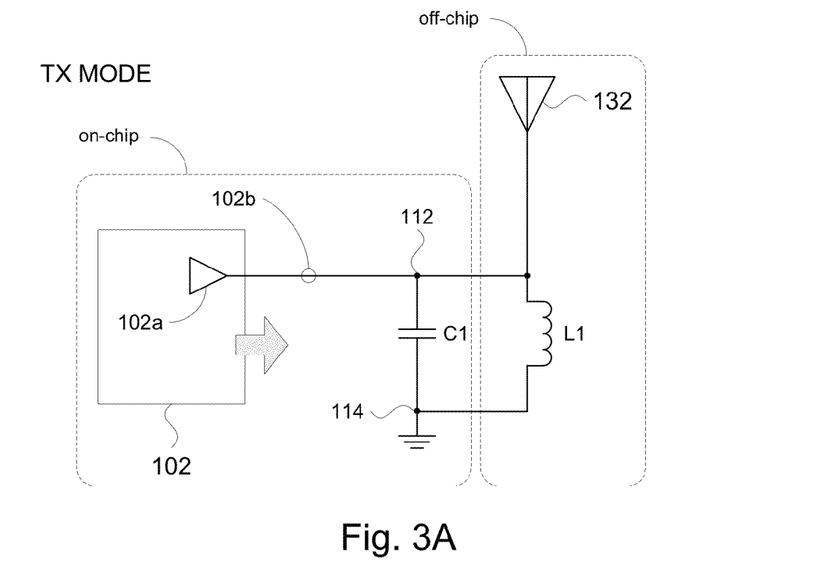
FIG. 3A shows an equivalent circuit in transmit mode.

Reference is now made to FIGS. 3 and 3A. FIG. 3 shows the switches SW1-SW3 configured to set up a transmission path 302 for transmit mode operation. For the particular embodiment of TR switch 106 shown in FIG. 2, the switches SW1, SW2, and SW3 are operated to be in a "closed" state, as schematically represented in FIG. 3. For example, in the case of an FET type switch, the closed states means the FET device is biased ON and thus becomes conductive. An advantageous aspect of the present disclosure is that all of the switches SW1-SW3 are operated in the closed state during transmit mode. This avoids electrical stress in the switches SW1-SW3 in the presence of high voltage transmit signals. For example, the voltage drop across the source and drain of an FET switch during transmit mode is very small (e.g., typically less than 100 mV) because the FET switch is ON and thus is in a conductive state.

In transmit mode, the TR switch 106 sets up a "transmit circuit" within the TR switch comprising capacitor C1 connected between an output of the transmitter stage 102 and ground, via switches SW1 and SW3. In this configuration, the inductor L2 and capacitor Cp are effectively omitted from the transmit circuit 102 by virtue of the node N2 being connected to ground potential via switch SW2. Signals produced by the transmitter stage 102 are thus electrically isolated from the receiver stage 104.

FIG. 3A illustrates an equivalent circuit as "seen" by the output 102b of the transmitter stage 102, showing the signal path for transmit signals when operating in transmit mode. The signal path includes output 102b connected to an LC circuit comprising on-chip capacitor C1 and off-chip inductor L1, and antenna 132. The LC circuit shown in FIG. 3A is sometimes referred to as a "tank circuit" or simply "tank." The LC circuit has a resonant frequency that is determined by the values of the inductor L1 and the capacitor C1. The values for L1 and C1 may be selected so that the resonant frequency is equal to the carrier frequency of the transmitter stage 102. An LC tank, in practice, has a very high impedance when it is operated at its resonant frequency, although in theory the impedance is infinite. Thus, when the transmitter stage 102 is transmitting, the LC circuit will appear as a very high impedance element. Accordingly, insertion loss due to the presence of the off-chip inductor L1 is greatly reduced so that advantageously most of the power output of the transmitter stage 102 is delivered to the antenna 132. The impedance of the resonant circuit (L1, C1) is determined by the loss of the inductor and capacitor. Capacitors typically have very low loss so it is primarily determined by the loss of the inductor. Using an external component (e.g., L1) significantly increases the impedance of the LC tank compared to the case where an on chip inductor is used.

Figure 4:
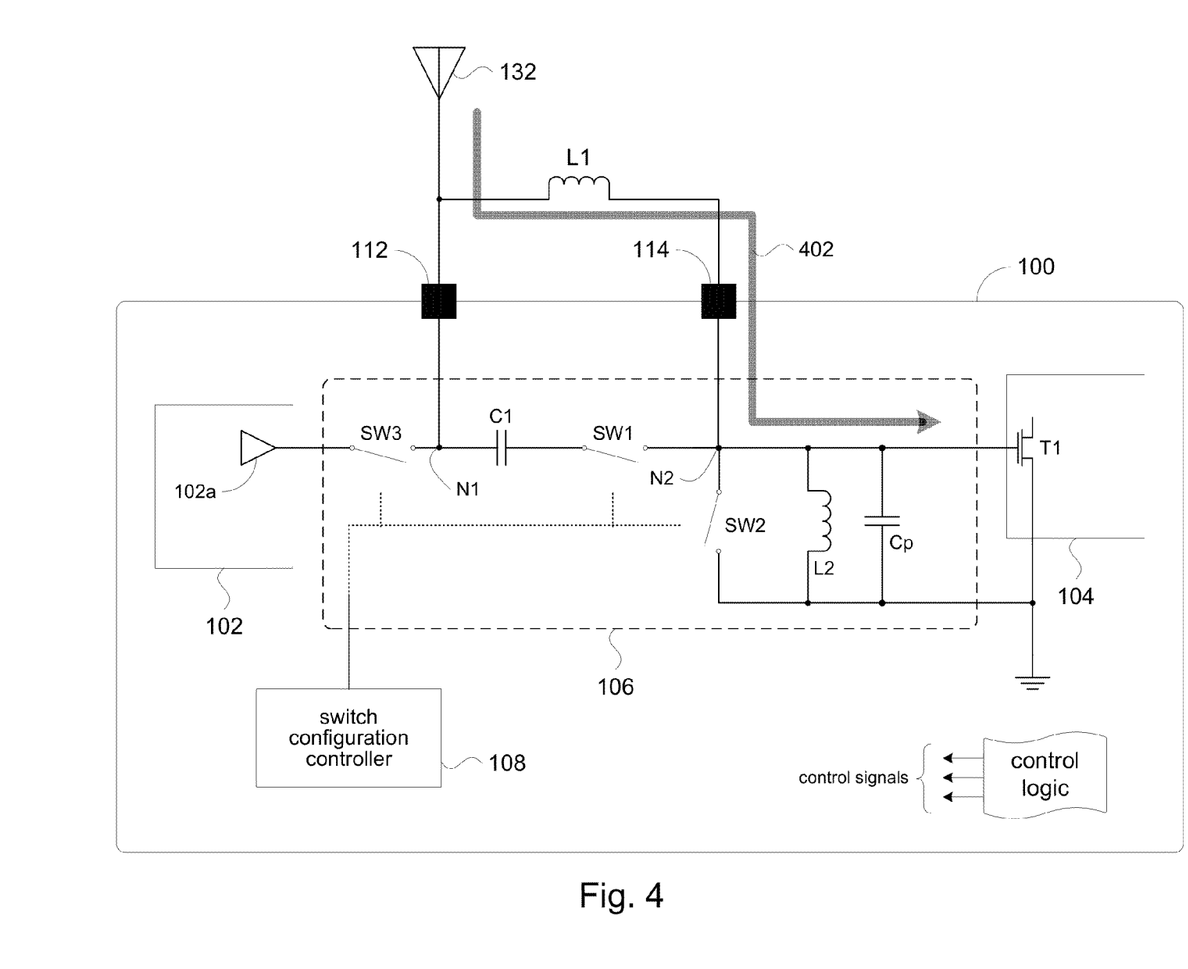
FIG. 4 shows the circuit of FIG. 1 in receive mode.
Figure 4A:
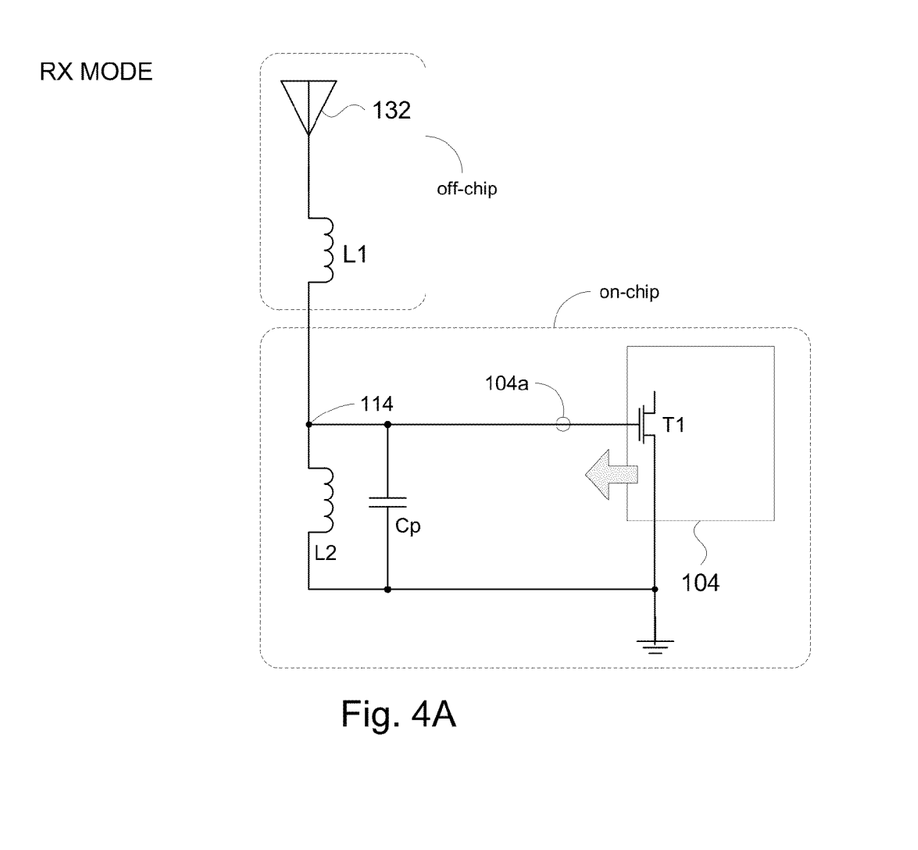
FIG. 4A shows an equivalent circuit in receive mode.

Reference is now made to FIGS. 4 and 4A. FIG. 4 shows the switches SW1-SW3 configured to set up a reception path 402 for receive mode operation. For the particular embodiment of the TR switch 106 shown in FIG. 2, the switches SW1, SW2, and SW3 are operated to be in an "open" state, as schematically represented in FIG. 4. For example, in the case of an FET type switch, the open state means the FET device is biased OFF and thus is not conducting. Unlike, transmit mode, signals that are present during receive mode operation are very low; e.g., on the order of millivolts or so. Accordingly, operating the switches SW1-SW3 in the open state for receive mode will not result in electrical stress on the switches. For example, the voltage drop across the source and drain of an FET switch is small during receive mode operation despite the FET switch being in the OFF state.

For receive mode operation, the TR switch 106 sets up a "reception circuit" within the TR switch comprising inductor L2 in parallel with the capacitor Cp. The L2 inductor is connected between an input of the receiver stage 104 and ground potential. In this configuration, the capacitor C1 is isolated from the receiver stage 104 by virtue of switches SW1 and SW3 being open.

FIG. 4A illustrates an equivalent circuit as seen looking out from the input 104a of the receiver stage 104, showing the signal path for received signals when operating in receive mode. The signal path includes the output 104a connected to the on-chip LC circuit (L2, Cp) in series with off-chip inductor L1, and antenna 132. Inductors L1 and L2 may be selected to improve impedance matching with the input impedance of the receiver stage 104. The inductors L1 and L2 may be selected to also improve the noise figure of the receiver stage.

In accordance with principles of the present disclosure, the transmit circuit that is set up during transmit mode is electrically isolated from the receive circuit, and vice versa, the receive circuit that is set up during receive mode is electrically isolated from the transmit circuit. By selectively switching out capacitor C1 during receive mode, the capacitor has no impact on the impedance matching that is provided by L1 and L2. In addition, the L2 inductor during receive mode may provide cancellation or nulling of the capacitor Cp. Inductor L2 may also provide improved ESD protection because it can conduct ESD events straight to ground by virtue of the inductor's connection to a ground.

In transmit mode, C1 is switched in and L2 is switched out. C1 creates an LC tank with inductor L1. Since the resonant frequency is set at the carrier frequency of the transmitter stage 102, the LC tank has a very high impendence and thus reduces insertion loss during transmission.

In some embodiments, the selection of values for C1 and L2 in the TR switch 106 may proceed by first selecting the value of the off-chip inductor L1. Having determined a value for L1, a value for C1 may then be determined, for example, based on a computation for computing the resonant frequency of an LC tank circuit comprising L1 and C1 where the resonant frequency is the same at the carrier frequency of the transmitter stage 102. With L1 and the resonant frequency being fixed, C1 can be readily computed. Thus, insertion loss in the transmit signal path 302 may be optimized when a proper value of C1 is selected. Since the L2 and Cp elements are switched out in transmit mode, by virtue of SW2 being in the closed state, the transmitter stage 102 sees only the LC tank circuit of L1 and C1. Accordingly, the LC tank can be optimized independently of L2 and Cp.

The value of L2 may be selected after having determined a suitable value for L1. Recall that capacitor Cp comprises largely the parasitic capacitance of transistor T1 in the LNA of the receiver stage 104 and the parasitic capacitance of switch SW2, and so the value of Cp may not be readily controlled. Accordingly, given that L1 and Cp are fixed, a proper value of L2 can be selected to create a suitable impedance matching network between the receiver stage 104 and the antenna 132. In an embodiment, as explained above, the value of capacitor Cp may be adjusted by including an actual physical capacitor, allowing a designer to vary the value of Cp and thus provide an additional degree of freedom in designing a suitable impedance matching network for the receiver stage 104. Since capacitor C1 is switched out in receive mode, it plays no role in determining the values for L2 and (optionally) Cp.

As can be appreciated from the discussion above, the value of C1 is set independently of the values of L2 and Cp, and so the transmit signal path 302 can be optimized without being affected by and without affecting the receive signal path 402. Conversely, the value of L2 (and optionally Cp) can be set independently of C1, and so the receive signal path 402 can be optimized without being affected by and without affecting the transmit signal path 302.

In some embodiments, rather than setting L1 first, the value of L1 may be determined after first setting C1 or L2 (and optionally Cp). For example, in some embodiments, it may be preferable to first select a value for C1. After a value for C1 is fixed, a value for L1 may then be determined in the manner explained above for the LC tank of L1 and C1. After L1 is determined, L2 (and optionally Cp) may then be selected based on the value of L1 in order to design a suitable impedance matching network comprising L1, L2, and Cp. In other embodiments, it may be preferable to first select values for L2 and Cp. After L2 and Cp are fixed, a value for L1 may then be determined. After L1 is determined, C1 may then be selected based on the value of L1.

Figure 5:
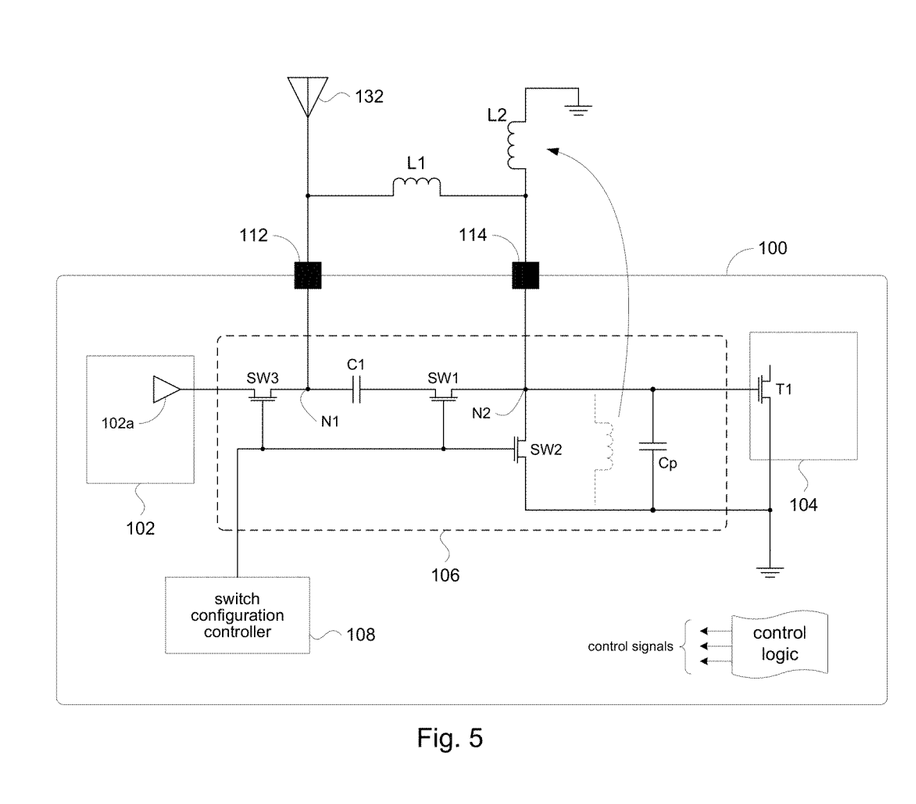
FIG. 5 shows an alternate circuit arrangement for the circuit shown in FIG. 1.
Figure 5A:
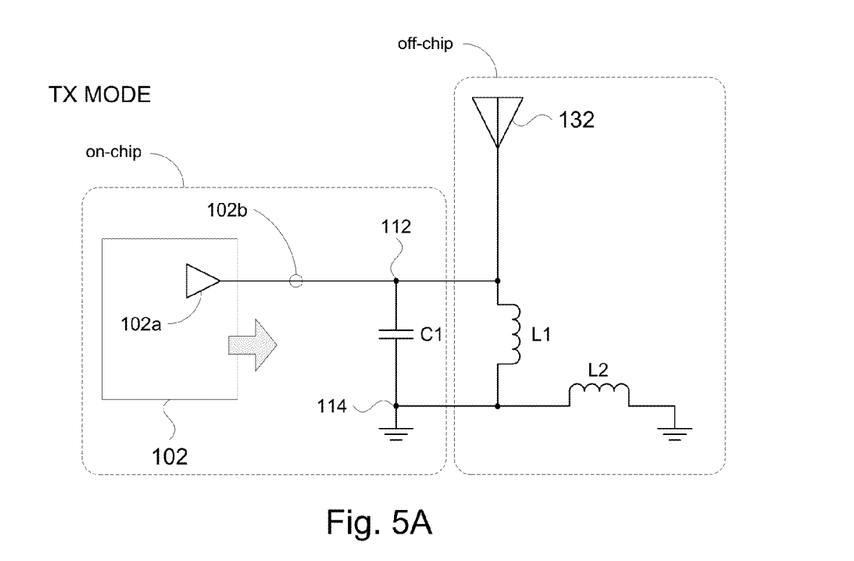
FIG. 5A shows an equivalent circuit when operating the circuit of FIG. 5 in transmit mode.

Referring to FIG. 5, in some embodiments the on-chip inductor L2 may be placed off-chip. An off-chip inductor generally offers much better performance over an on-chip inductor. Accordingly, having an off-chip inductor L2 may further improve the noise figure of the receiver stage 104. The equivalent circuit using an off-chip inductor that is seen looking out from the input 104a of the receiver stage 104 when the switches SW1-SW3 are configured for receive mode operation is the same as shown in FIG. 4A. However, since inductor L2 in FIG. 5 is now off-chip, the inductor is also present when operating in transmit mode. FIG. 5A shows the signal path for transmit mode operation. The value for C1 in computing the resonant frequency can simply be based on the parallel combination of L1 and L2.

Figure 6:
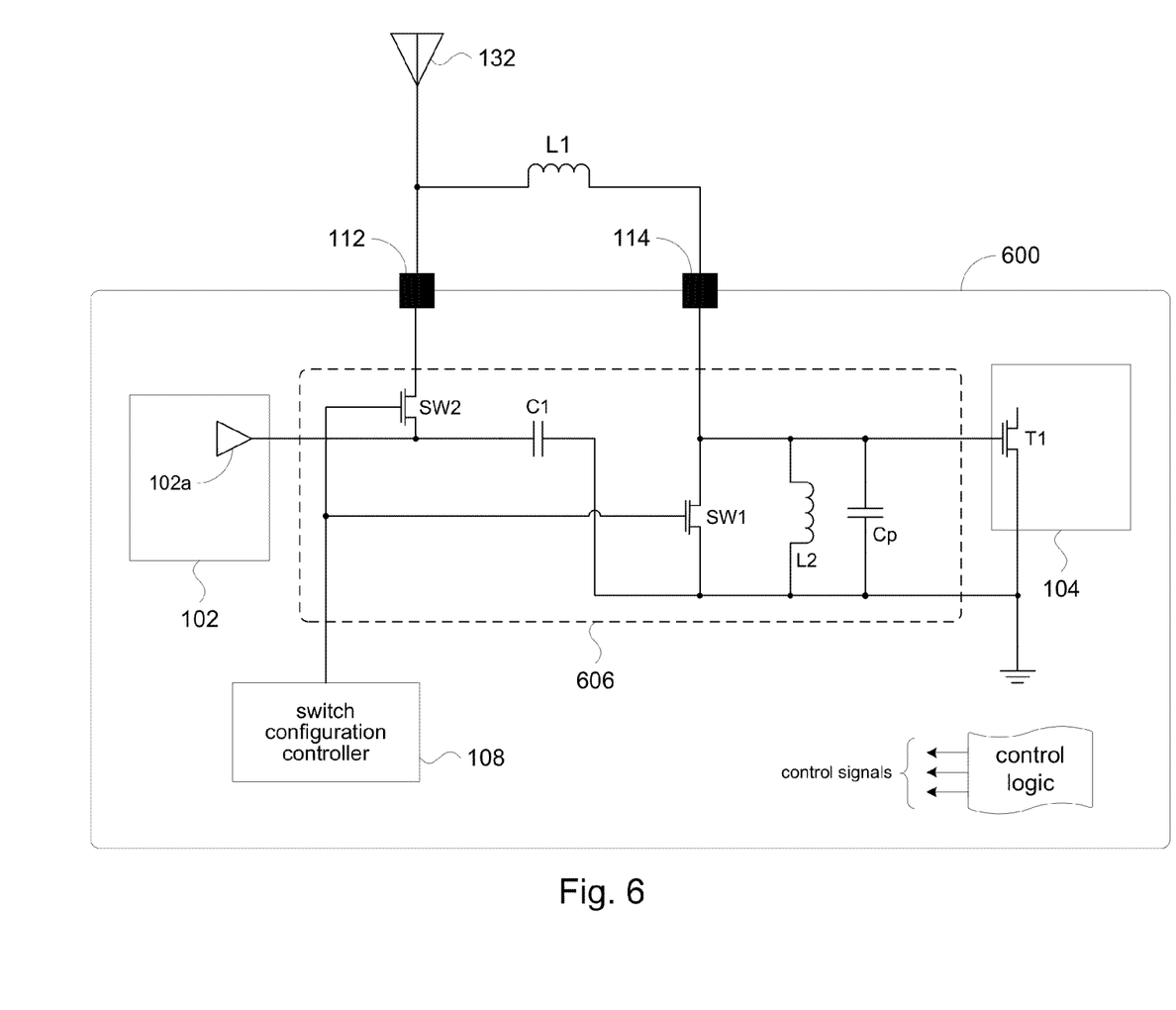
FIG. 6 depicts another illustrative example of a circuit of the present disclosure.

Referring to FIG. 6, another embodiment of a TR switch in accordance with the present disclosure is shown. IC device 600 shown in FIG. 6 comprises the same elements as IC device 100 shown in FIG. 1, but with an alternate TR switch 606. The TR switch 606 comprises two switching elements SW1 and SW2. The switching elements SW1 and SW2 may be any suitable device that can be fabricated on-chip in the IC device 600. In some embodiments, for example, the switching elements SW1 and SW2 may be FET devices.

In transmit mode, the switches SW1 and SW2 are operated in the closed state. As can be appreciated from FIG. 6, the equivalent circuit that is seen by the output 102b of the transmitter stage 102 when the switches SW1 and SW2 are configured for transmit mode is the same as shown in FIG. 3A. The same benefits are realized, namely, there is no electrical stress on either of the switches SW1 and SW1 in presence of high voltage transmit signals because the switches are in the closed state. And there is the benefit of low insertion loss because the LC tank (L1, C1) can be designed to have a resonant frequency at the carrier of the transmitter stage 102 and thus present a high impedance.

Figure 6A:
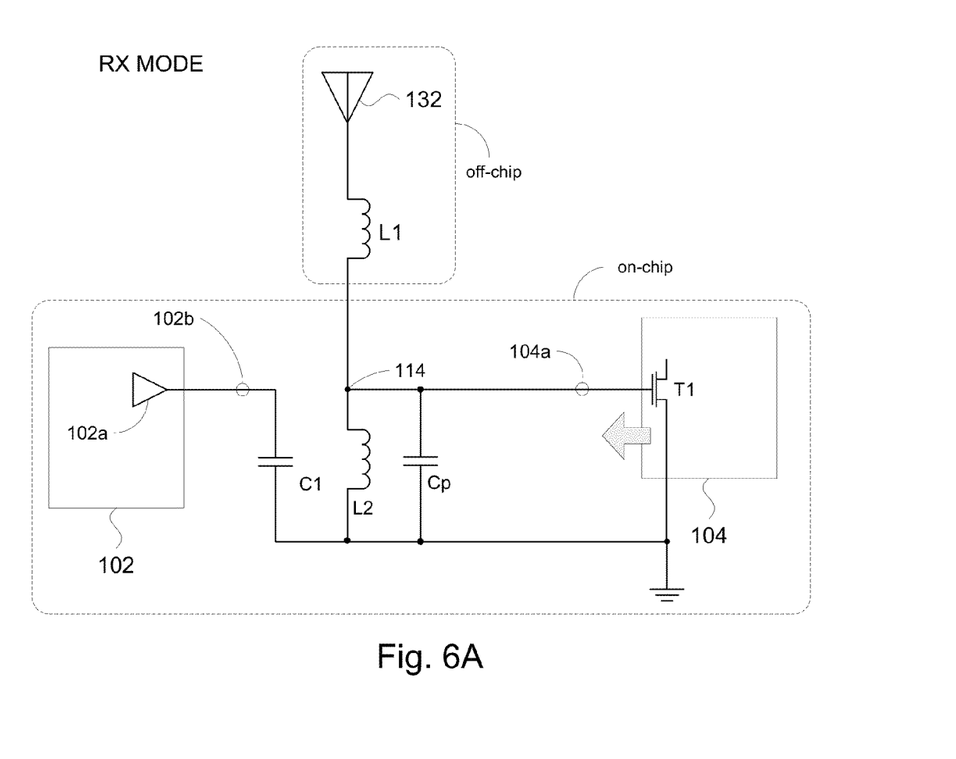
FIG. 6A shows an equivalent circuit when operating the circuit of FIG. 6 in receive mode.

In receive mode, the switches SW1 and SW2 are operated in the open state. FIG. 6A shows an equivalent circuit configuration when operating the IC device 600 in receive mode. The signal path that a received signal follows is the same as shown in FIG. 4A. However, there is an additional segment between the transmitter stage 102 and ground via capacitor C1. The additional signal, though isolated from the receiver stage 104, may nonetheless be beneficial to the receiver stage 104 because it can shunt a range of high frequency noise (determined by the value of C1) that may be produced by the transmitter stage 102, thus improving the noise figure of the receiver stage.

The above description illustrates various embodiments of the present disclosure along with examples of how aspects of they may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the claims.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

What is claimed is:

1. An integrated circuit (IC) device comprising:
a transmitter stage;
a receiver stage;
two interface pins configured for connection to an antenna; and
a switching component coupled to each of (i) the transmitter stage, (ii) the receiver stage, and (ii) the two interface pins,
wherein the switching component comprises a capacitor,
wherein the switching component is configured to operate in one of a first configuration and a second configuration,
wherein while the switching component operates in the first configuration, the switching component is configured to (i) transmit a transmit signal produced by the transmitter stage to at least one of the two interface pins, (ii) electrically isolate the transmitter stage from the receiver stage, and (iii) couple the capacitor between the transmitter stage and a ground node, and
wherein while the switching component operates in the second configuration, the switching component is configured to (i) transmit a receive signal from at least one of the two interface pins to the receiver stage, (ii) electrically isolate the antenna from the transmitter stage, and (iii) refrain from coupling the capacitor between the transmitter stage and the ground node.

2. The IC device of claim 1, wherein:
wherein the switching component comprises an inductor; and
while the switching component operates in the first configuration, the switching component is configured to bypass the inductor by electrically coupling each of a first end and a second end of the inductor to the ground node.

3. The IC device of claim 2, wherein:
while the switching component operates in the second configuration, the switching component is configured (i) electrically coupling the first end of the inductor to an input of the receiver stage, and (ii) electrically coupling the second end of the inductor to the ground node.

4. An integrated circuit (IC) device comprising:
a transmitter stage;
a receiver stage;
two interface pins configured for connection to an antenna; and
a switching component coupled to each of (i) the transmitter stage, (ii) the receiver stage, and (ii) the two interface pins,
wherein the switching component is configured to operate in one of a first configuration and a second configuration,
wherein while the switching component operates in the first configuration, the switching component is configured to (i) transmit a transmit signal produced by the transmitter stage to at least one of the two interface pins, and (ii) electrically isolate the transmitter stage from the receiver stage,
wherein while the switching component operates in the second configuration, the switching component is configured to (i) transmit a receive signal from at least one of the two interface pins to the receiver stage, and (ii) electrically isolate the antenna from the transmitter stage,
wherein the switching component comprises a plurality of switches,
wherein all of the plurality of switches are in a closed state while the switching component operates in the first configuration, and
wherein all of the plurality of switches are in an open state while the switching component operates in the second configuration.

5. An integrated circuit (IC) device comprising:
a transmitter stage;
a receiver stage;
two interface pins configured for connection to an antenna; and
a switching component coupled to each of (i) the transmitter stage, (ii) the receiver stage, and (ii) the two interface pins,
wherein the switching component is configured to operate in one of a first configuration and a second configuration,
wherein while the switching component operates in the first configuration, the switching component is configured to (i) transmit a transmit signal produced by the transmitter stage to at least one of the two interface pins, and (ii) electrically isolate the transmitter stage from the receiver stage,
wherein while the switching component operates in the second configuration, the switching component is configured to (i) transmit a receive signal from at least one of the two interface pins to the receiver stage, and (ii) electrically isolate the antenna from the transmitter stage,
wherein the switching component comprises an on-chip capacitor, and
wherein the value of the on-chip capacitor is determined based only on an off-chip inductor connected across two terminals of the IC device.

6. The IC device of claim 5, wherein the on-chip capacitor and the off-chip inductor define a resonant circuit having a resonant frequency substantially equal to a frequency of a carrier signal of the transmitter stage in the IC device.

7. The IC device of claim 5, wherein:
the receive circuit is an on-chip inductor; and
the value of the on-chip inductor is determined based only on the off-chip inductor and on an electrical characteristic of the receiver stage of the IC device.

8. A circuit comprising:
a transmitter stage;
a receiver stage;
a switching component coupled to the transmitter stage and the receiver stage, the switching component having a first configuration comprising a transmit circuit that couples a transmit signal produced by the transmitter stage to an antenna assembly connected to the circuit, the switching component having a second configuration comprising a receive circuit that couples a receive signal at the antenna assembly to the receiver stage, wherein, when the switching component is in the first configuration, a signal produced by the transmitter stage of the IC device is electrically isolated from elements of the receive circuit, wherein, when the switching component is in the second configuration, a signal received by the antenna is electrically isolated from elements of the transmit circuit, wherein the switching component comprises a plurality of switches, wherein all of the switches are in a closed state in the first configuration, and wherein all of the switches are in an open state in the second configuration.

9. The circuit of claim 8, wherein the transmit circuit comprises at least one inductor or capacitor, wherein the receive circuit comprises at least one inductor or capacitor.

10. The circuit of claim 8, wherein the transmit circuit comprises an on-chip capacitor, wherein the value of the capacitor is determined based only on an off-chip inductor connected to the circuit, wherein the receive circuit is an on-chip inductor, wherein the value of the inductor is determined based only on the off-chip inductor and on an electrical characteristic of the receiver stage.

11. A method of operating an integrated circuit device, wherein the integrated circuit device comprises (i) a transmitter stage, (ii) a receiver stage, (iii) two interface pins configured for connection to an antenna, and (iv) a switching component, wherein the switching component comprises a capacitor, and wherein the method comprises:

operating the switching component in one of a first configuration and a second configuration;

while operating the switching component in the first configuration, transmitting, by the switching component, a transmit signal from the transmitter stage to at least one of the two interface pins, electrically isolating, by the switching component, the transmitter stage from the receiver stage, and coupling the capacitor between the transmitter stage and a ground node; and while operating the switching component in the first configuration, transmitting, by the switching component, a receive signal from at least one of the two interface pins to the receiver stage to the receiver stage, electrically isolating, by the switching component, the antenna from the transmitter stage, and refraining from coupling the capacitor between the transmitter stage and the ground node.

12. The method of claim 11, wherein the switching component comprises an inductor, and wherein the method further comprises:

while operating the switching component in the first configuration, bypassing, by the switching component, the inductor by electrically coupling each of a first end and a second end of the inductor to the ground node.

13. The method of claim 12, further comprising:

while operating the switching component in the second configuration, electrically coupling, by the switching component, the first end of the inductor to an input of the receiver stage, and electrically coupling, by the switching component, the second end of the inductor to the ground node.

14. A method of operating an integrated circuit device, wherein the integrated circuit device comprises (i) a transmitter stage, (ii) a receiver stage, (iii) two interface pins configured for connection to an antenna, and (iv) a switching component, wherein the switching component comprises a plurality of switches, and wherein the method comprises:

operating the switching component in one of a first configuration and a second configuration;

while operating the switching component in the first configuration, transmitting, by the switching component, a transmit signal from the transmitter stage to at least one of the two interface pins, electrically isolating, by the switching component, the transmitter stage from the receiver stage, and operating the plurality of switches such that each of the plurality of switches is in a closed state; and while operating the switching component in the first configuration, transmitting, by the switching component, a receive signal from at least one of the two interface pins to the receiver stage to the receiver stage, electrically isolating, by the switching component, the antenna from the transmitter stage, and operating the plurality of switches such that each of the plurality of switches is in an open state.

\* \* \* \* \*